US004001773B2

United States Statutory Invention Registration [19]

[11] Reg. Number: H1773

Cheston et al.

[45] Published: Jan. 5, 1999

[54] ULTRA-WIDEBAND ACTIVE ELECTRONICALLY SCANNED ANTENNA

[75] Inventors: Theodore C. Cheston, Bethesda, Md.; H. Paris Coleman, Alexandria, Va.

[73] Assignee: United States of America, Washington, D.C.

[21] Appl. No.: 34,950

[22] Filed: Feb. 10, 1998

[51] Int. Cl.[6] ..... H01Q 3/26

[52] U.S. Cl. ..... 342/375

*Primary Examiner*—Daniel T. Pihulic

*Attorney, Agent, or Firm*—Thomas E. McDonnell; Charles J. Stockstill

[57] ABSTRACT

The architecture of this invention makes multiple use of switched time-delay circuits to reduce the complexity of both series and parallel feed antenna arrays. Each time-delay circuit can give a delay that can be switched to values between 0 and 2d/c, where d is the inter-element spacing and c is the velocity of light. At the highest frequency of the series feed array, the elements are spaced by λ/2 to avoid grating lobes and the maximum delay corresponds to 360° of phaseshift. When the time-delays are set half way (d/c), the various lines feeding the elements of the array at the aperture have bias delays that make them all equal in length, thereby giving a broadside beam, independent of frequency. At the highest frequency, the switchable time delay gives some excess in available delay. If additional excess time-delay is needed it can be obtained by increasing the time delay circuit range. Insertion loss is proportional to the number of bits used. This could become high in large antennas, however, this loss may be compensated by the addition of two-way amplification in the branch lines with an appropriate bias length adjustment. Also the insertion loss may be reduced by dividing the array into subarrays which are then combined by a series feed combiner network.

8 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ULTRA-WIDEBAND ACTIVE ELECTRONICALLY SCANNED ANTENNA

BACKGROUND OF THE INVENTION

1. Field of the Invention

This invention deals with time-delay circuits utilized for beamforming in a phased array antenna system and more particularly to a phased array antenna system utilizing switched time-delay circuits to significantly reduce the complexity of time-delay beam steering.

2. Description of the Related Art

Basically, the phased-array antenna is composed of a group of individual radiators which are distributed and oriented in a linear or two-dimensional spatial configuration. The amplitude and phased excitations of each radiator can be individually controlled to form a radiated beam. The position of the beam in space is controlled electronically by adjusting the phase of the excitation signals at the individual radiators. Hence, beam scanning is accomplished with the antenna aperture remaining fixed in space without the involvement of mechanical motion in the scanning process. An electronically steered antenna array radar is able to track a large number of targets and illuminate some of these targets with radio-frequency energy. The antenna beamwidth may be changed electronically by means of phase spoiling to search certain areas more rapidly but with less gain. Frequency agility can be achieved through changing the frequency of transmission at will from pulse to pulse, but requires sequential phase adjustments since the beam pointing direction with phase control is narrow band and changes with frequency.

Phase change at the elements due to change in frequency is exploited in frequency scanned arrays, but with phased arrays it restricts the use of wide instantaneous bandwidth, which is needed to enhance radar capabilities and performance. The narrow bandwidth of phased arrays is due to phase being controlled for the antenna aperture excitation, and steered beams will scan towards broadside as the frequency is increased, and thus move off the target.

SUMMARY OF THE INVENTION

The object of this invention is to provide an ultra-wideband active electronically scanned antenna that utilizes compensating line lengths in cascade in an antenna branch feed line thereby providing a variable time-delay along the branch to each antenna element, thereby allowing smaller component structure than the prior art throughout the system.

The object of this invention is to enhance the performance of radar by allowing wide instantaneous bandwidth through the use of short time-delay circuitry.

Another object of this invention is to reduce the cost of radars by providing short time-delay circuits.

These and other objectives are obtained by utilizing an architecture utilizing simple, variable, and short time-delay circuits to significantly reduce the complexity of time-delay beam-steering. The architecture is substantially frequency independent and allows "shared apertures" concepts in both series and parallel (corporate) feed antenna arrays. The architecture may be applied to active "phased" arrays where any losses are made up by amplification on both transmit and receive.

DESCRIPTION OF THE PREFERRED EMBODIMENT

Figure 1:
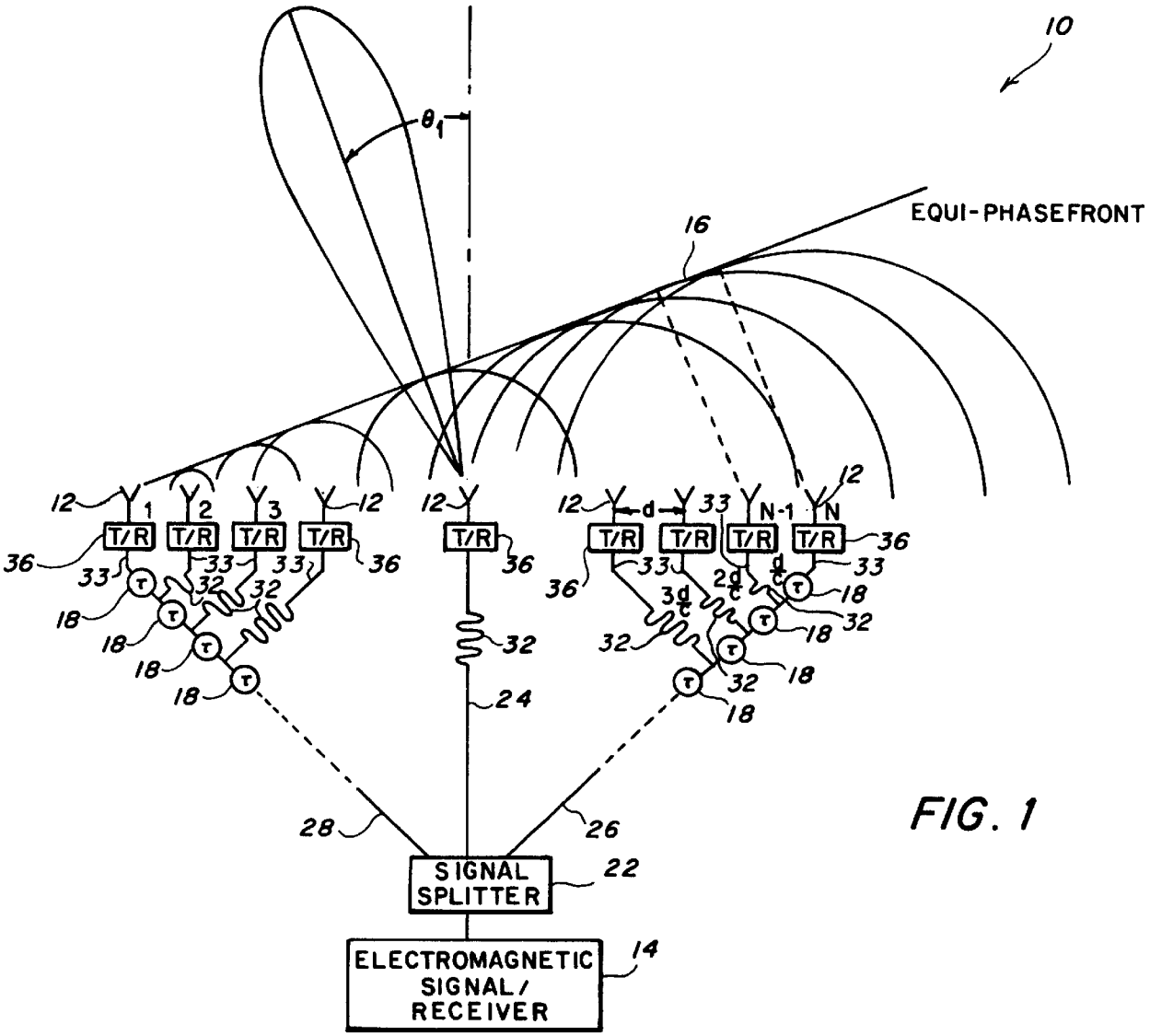
FIG. 1 is a schematic of the architecture for an ultra-wideband beam forming line source with a series feed having adjustable time delay modules having an odd number of antenna elements.

In the preferred embodiment 10, shown in FIG. 1, ultra-wideband beamforming with a series feed in its simplest form is shown that is comprised of a plurality of time delay circuits 18 having a means for switching in time delays from 0 to 2d/c, where d is the inter-element spacing and c is the velocity of light. At the highest frequency the elements are spaced by $\lambda/2$ to avoid grating lobes and the delay corresponds to 360° of phaseshift, as with a normal phaseshifter.

In the series feed, an electromagnetic signal is coupled at uniform intervals along branch lines 24, 26, and 28 to antenna feed line 33 to radiating elements, 12 that are equally spaced along the aperture. For frequency independent steering of the beam, the electrical pathlengths from the electromagnetic signal source 14 to each radiating element 12 to the desired equiphasefront 16 must be the same. This is accomplished by the insertion of an adjustable time-delay circuit 18 into the antenna feed line 33 prior to each element 12.

An electromagnetic signal generated by an electromagnetic signal source 14, such as a radar or microwave transmitter, passes through a signal splitter 22 which divides the electromagnetic signal into a plurality of electromagnetic signals which are applied to the antenna elements 12 through a plurality of signal branches 24, 26, and 28. For an antenna array having an odd number of branches, at minimum there are three branches, a center or central branch 24, a right branch, and a left branch, 26 and 28, respectively. The center, or central, branch 24 is without variable time-delay 18, having only a bias delay 32 of a preselected amount. Its feed length is the same as that of the other branches 26 and 28 with delay adjusted to d/c. Dependent upon the operational frequency and power of the system, these branches 24, 26, and 28 and element feedlines 33 may be either waveguides, coaxial cable, or microstrip.

The time-delay circuits 18 are reciprocal so that one setting applies equally for transmitting and receiving. When the time-delays 18 are set half way, i.e., to d/c, then the various lines 33 feeding the radiating elements 12 at the aperture have bias delays 32 of predetermined amounts making them all equal; that setting will therefore give a broadside beam, independent of the frequency. The bias delay 32 is about a/2c at the center of the array, where a is the aperture size, and reduces to zero at the edge.

To scan the beam, each one of the time-delay circuits 18 in the branch 26 is ideally set to the same value (d/c)+(d/c) sin $\Theta_1$, where $\Theta_1$ is the scan angle, and similarly, all the time delay circuits 18 in branch 28 elements are set to (d/c)−(d/c) Sin $\Theta_1$, all independent of frequency. This gives both frequency independent scanning and also makes for a very simple scanning calculation with only two drivers necessary if they can handle the power. Under the above conditions, the smallest change in beampointing direction is obtained by changing each one of the switchable time-delays 18 by the smallest bit. With N radiating elements 12 and n bits of time-delay 18, the minimal change in beampointing direction is $N/2^n$ scanned beamwidths at the highest frequency. For example, when N=64 and n=6, the minimal step change in beam position is one beamwidth.

Branch time delays 18 may be set individually and thereby forego the granular rough-plus-fine steering method discussed above. Each of the branch time-delays 18 is set to give the closest correct value for that station, as can be achieved with the available number of bits. The most central branch 24 delay circuit 32 is set first, followed sequentially by the more outward circuits, taking into account all previous delay contributions as well as correction data from previous calibration.

Switchable time-delay 18 of 0 to 2d/c, with d=λ/2 at the highest frequency, gives some excess in available delay, since this value allows scanning to ±90°. Holding scanning to, for example, ±60° requires only sin 60°=0.866 times that delay. Additional excess time-delay, if needed, for example, for the correction of construction errors, can be obtained by increasing the time-delay circuit 18 range from a maximum of 2d/c to perhaps 2.2d/c.

Figure 1A:
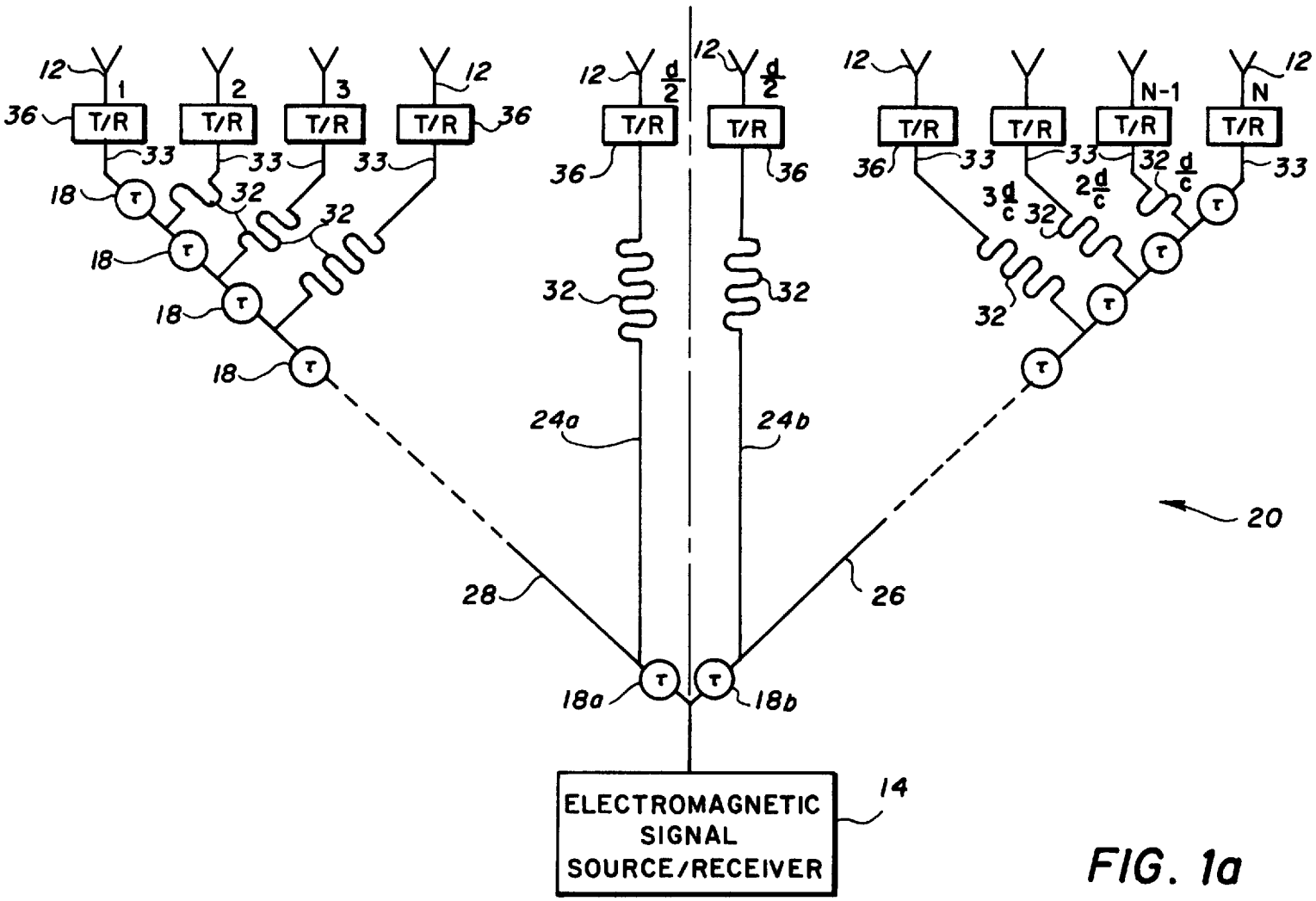
FIG. 1*a* is a schematic of the architecture for an ultra-wideband beam forming line source with a series feed having adjustable time delay modules having an even number of antenna elements.

For an antenna array having an even number of elements, there are two branches 24*a* and 24*b* in the center of the array, as shown in FIG. 1*a*, one on each side of the center line and spaced d/2 from the center line. The switchable time delays 18*a* and 18*b* for those two branches 24*a* and 24*b*, respectively, would have to be one half of that of the other time-delay circuits 18, i.e., ½ d/c±½ d/c sin $\Theta_0$. The time-delays at the antennas 12 associated with these branches 24*a* and 24*b*, with bias 32, and a time-delay setting of ¼ d/c time-delay circuits 18*a* and 18*b* is the same as that of the other elements with their delay adjusted to d/c.

The insertion loss for the time delay circuits 18 is expressed in dB and is approximately proportional to the number of bits used. The total loss at the end-element is $$L = nL_B\frac{N}{2}\ dB \tag{1}$$

where N/2 is the number of radiating elements 12 fed by one branch 24, 26, and 28 (the aperture has N or N+1 elements where N is an even number), n is the number of bits in each switchable branch time-delay circuit 18, and $L_B$ is the loss per bit in dB. With practical losses per bit and the large number of bits required for low sidelobes, this loss quickly becomes prohibitive for large antennas. For example, if it is assumed a loss per bit of $L_B$=0.2 dB, n=6, and N=64, then the maximum insertion loss at the edge element is L=38.4 dB. This is not acceptable, even in view of a desirable receiver illumination edge taper.

Figure 1C:
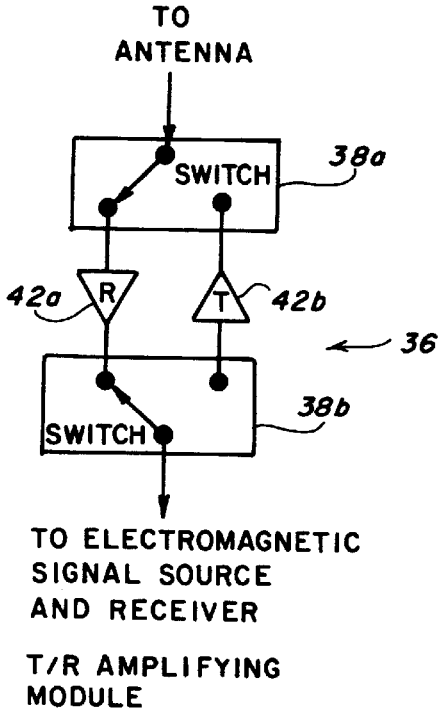
FIG. 1*c* is a schematic of a transmit/receive module.
Figure 1B:
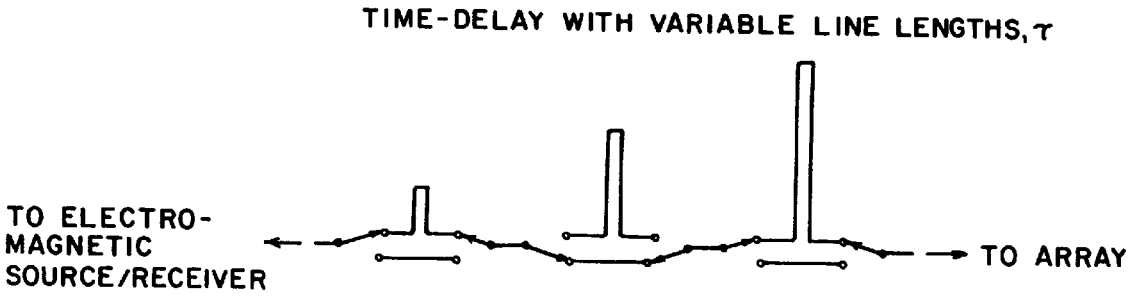
FIG. 1*b* is a schematic of an adjustable time-delay module utilizing solid state components.
Figure 2:
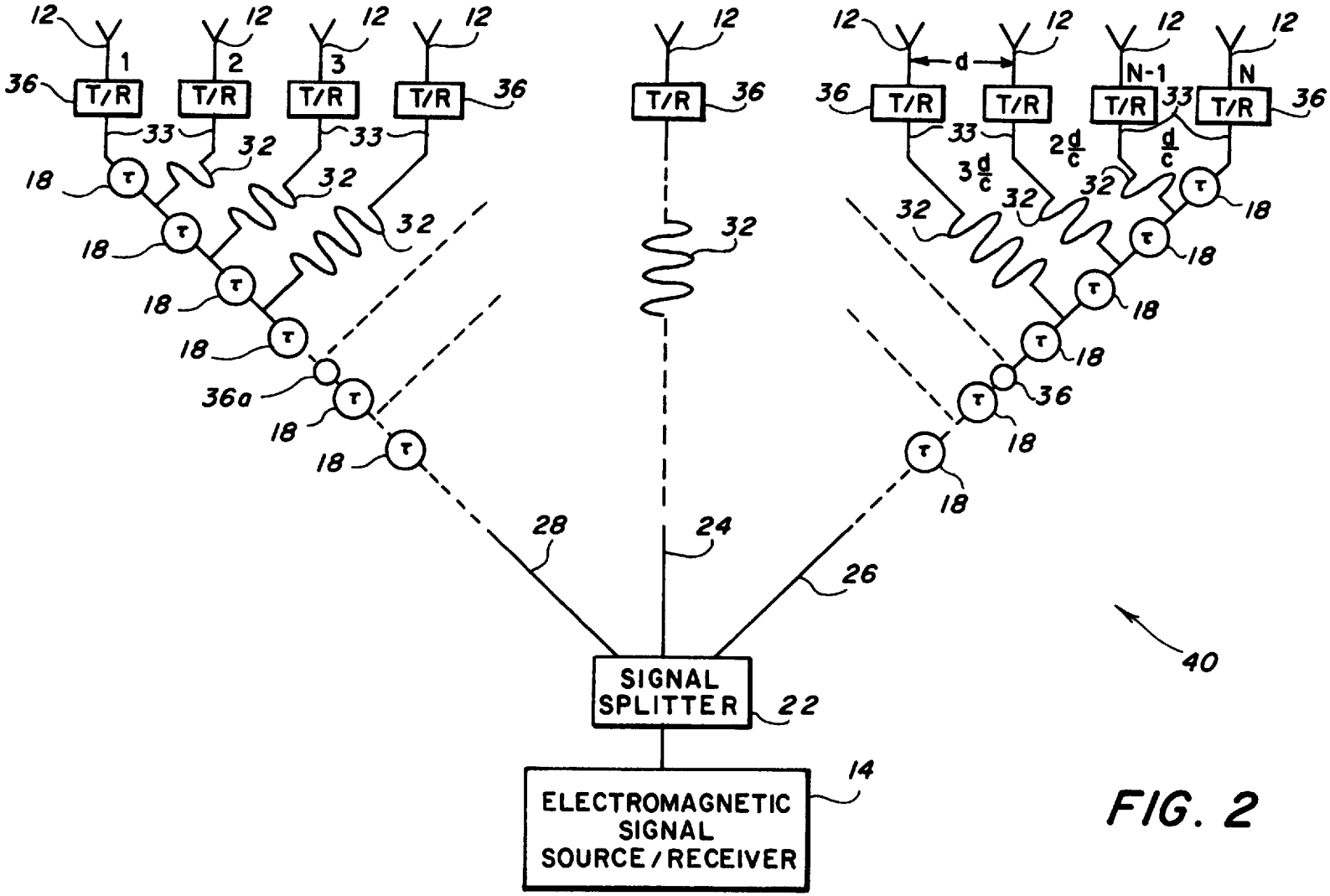
FIG. 2 is a schematic of the architecture for an ultra-wideband beam forming line-source having adjustable time-delay modules with two-way amplification in the branch lines at one or more locations.

A significant reduction in insertion loss may be obtained by adding solid-state amplifier modules 36, FIG. 1*c*, to each branch 26, and 28, as in the series feed embodiment depicted in 40, FIG. 2. Fine steering (and correction for construction errorsd) could be accomplished by the addition of an additional switched time-delay circuit 18 at each module 36. The design and construction of the solid-state amplifier module 36 is well known to those skilled in the art.

Figure 3:
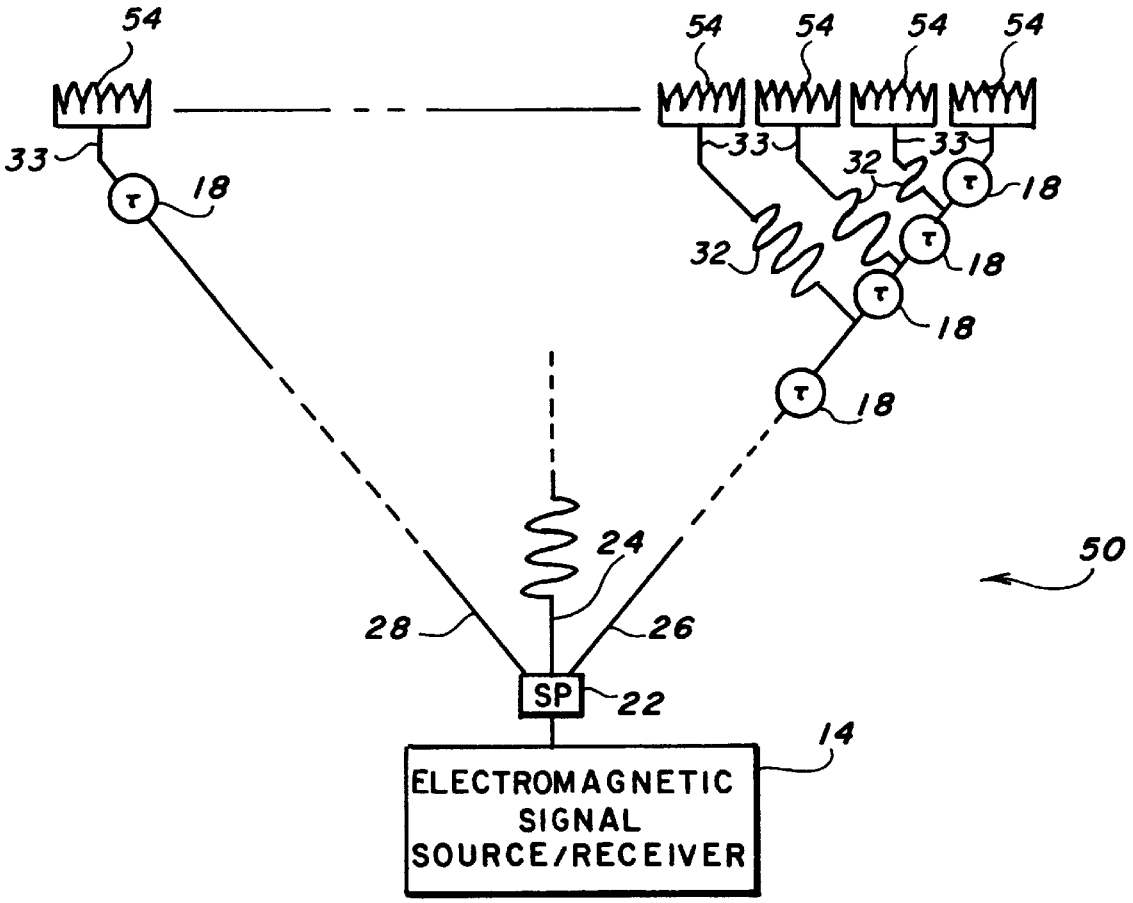
FIG. 3 is a schematic of a series feed combiner network utilizing subarrays and having adjustable time-delays.

Also, the insertion loss may be reduced by dividing the arrays 12 in the form of the preferred embodiment as shown in FIG. 1 into subarrays 54, as shown in FIG. 3. These subarrays 54 are then combined by a further, similar, series feed combiner network 50. This method will give frequency independent beam steering but at the cost of an increase in the number of time-delay circuits 18. The total insertion loss to the last antenna element 12 in this case is $$L_\tau = \left(\frac{N_S}{2}\right)nL_B + \left(\frac{M}{2}\right)n_cL_BdB \tag{2}$$

where M is the number of subarrays, $N_S$ is the number of elements per subarray, $n_C$ is the number of bits in the combining branch delay, n is the number of bits in the subarray delay, and $L_B$ is the loss per bit in dB. This gives an improvement factor to the loss in dB of $$\left(\frac{L}{L_\tau}\right) = \frac{N}{N_S + \frac{Mn_c}{n}} \tag{3}$$

where $N=N_S\times M$. Using the above example of N=64, but with M=8 subarrays, each with $N_S$=8 elements, and with n=6 and $n_C$=9 (maximum time-delay increased from (2d/c) to (8×2d/c)), this subarray architecture gives an improvement factor $L/L_\tau$=3.2 or a total insertion loss of 12 dB, which generally is considered acceptable in such cases.

Figure 4:
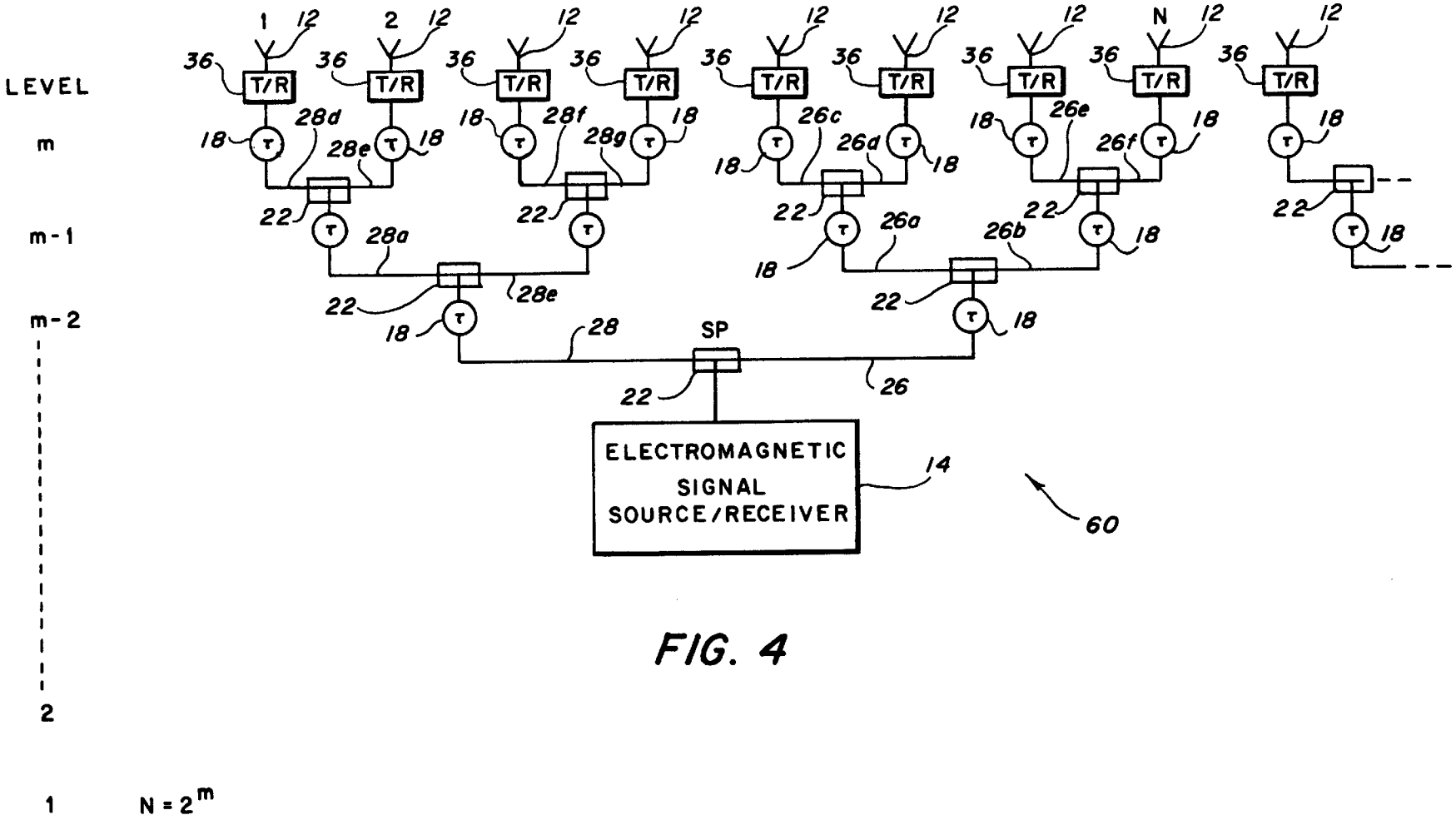
FIG. 4 is a schematic of an ultra-wideband corporate feed architecture having adjustable time-delays.

Another preferred embodiment, shown in FIG. 4, is an active corporate, or parallel, feed architecture 60 with switchable time-delay-line circuits 18. In a parallel feed the electromagnetic energy is fed in parallel to a set of delay lines i.e., 18, each time-delay-line circuit 18 being systematically shorter than the prior one in electrical path to the array 12. In comparison with the series architecture, shown above in FIG. 1, a parallel feed architecture 60 requires longer switchable, or variable, delay-lines time-delay-line circuits 18. The maximum time-delay required is (Nd/2c)= a/2c, where a is the aperture size, c is the velocity of light, and N is the number of radiating elements. However, there is less insertion loss since only level m time-delays are in series where $2^m$=N. The loss is sufficiently small so that it can be compensated by amplification in the solid state modules. For the corporate feed configurations, there is no need for bias time time-delay circuits 32, as shown in FIG. 1.

For a two-dimensional array many linear array feed networks could be stacked, say in the vertical plane and combined by one further such network. Monopulse can be added readily with a second vertical combiner and horizontal monopulse outputs. Optimization monopulse outputs with low sidelobes in both sum and difference channels is possible, but requires additional complexity.

A combination of series (FIG. 1) and corporate (FIG. 4) architecture 10 and 60, respectively, is possible in a variety of ways, with different parts of the dividing network using different configurations. Further, the binary divisions of the corporate architecture 60 may be replaced by any multiple division network. Time-delay architecture may also be combined with phase controlled subarrays. This would limit the bandwidth to that of the subarrays.

It is further possible to end-feed the array but that may lead to an asymmetric amplitude taper due to cumulative insertion losses that would require compensation.

In all embodiments, the amount of switchable time-delays may be increased to allow an excess for error correction.

A figure of merit (FOM) can be derived to assess the total provided switched time-delay of a system. It is given by the ratio $$FOM = \frac{\text{Total switched time-delay for conventional feed system}}{\text{Total switched time-delay for proposed feed system}} \quad (4)$$

Figure 5:
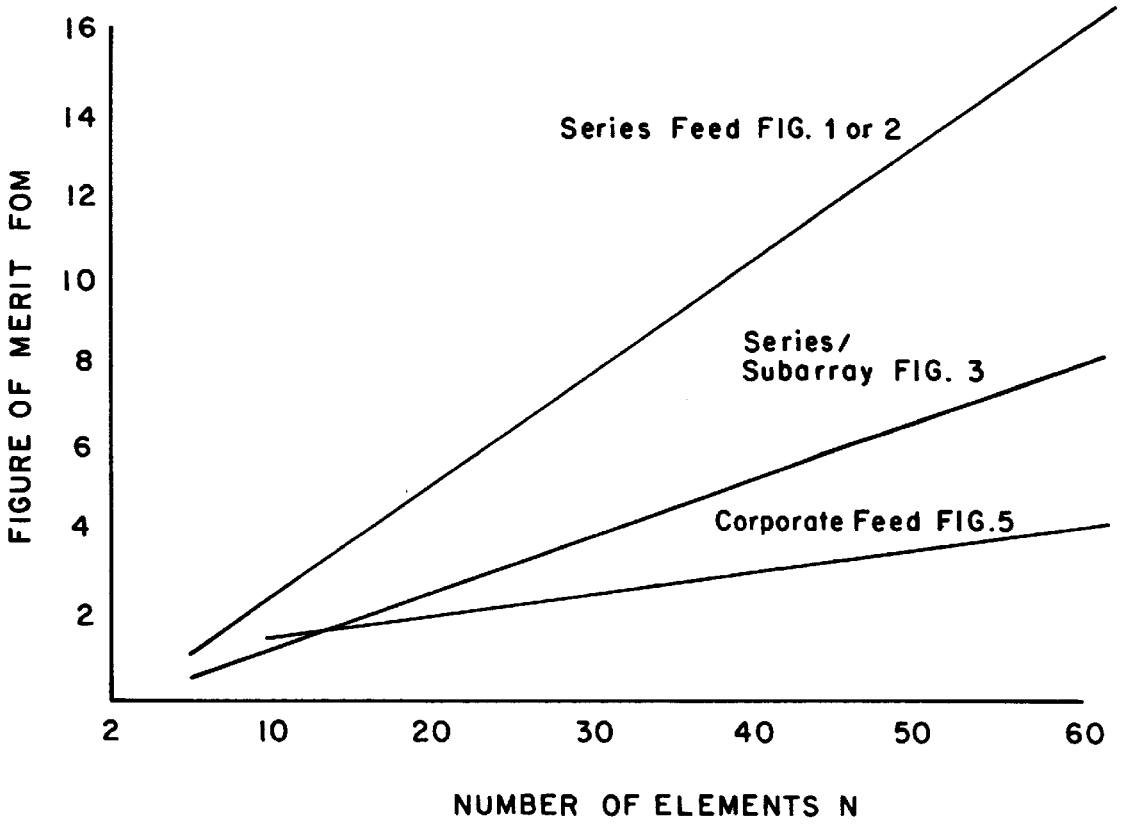
FIG. 5 is a plot of the figure of merit (FOM) versus the number of elements (N) of an ultra-wideband linear array.

The total switched time-delay is the sum of the maximum values of all switchable time-delay networks used. The conventional system is a configuration where each radiating element has its own unique switchable time-delay. They vary from a/c at the edge to zero at the center, giving a total time delay of Na/2c. FOMs for the various configurations are shown in Table 1, and are plotted in FIG. 5. Table 1 shows the switchable time-delay for different architectures when compared with a conventional system as known in the art. A larger FOM indicates improvement, i.e., smaller total time delay required by the system.

The ultra-wide-bandwidth active phased array architecture, described above, makes use of simple, variable, and short time-delay circuits, as previously stated, substantially no different from the standard diode phaseshifters, but makes multiple use of the same device. The architecture is substantially frequency independent and thus allows some "shared

TABLE 1

COMPARISON OF DIFFERENT ARCHITECTURES

| Ultra-Wideband Architecture | Total Switchable Time Delay | |
|---|---|---|
| Conventional | Na/2c | 1 |
| Series feed, FIG. 1 | 2a/c | N/4 |
| Series-subarrays, FIG. 3 | 4a/c | N/8 |
| Corporate feed, FIG. 4 | (alogN)/(clog2) | 0.15N/logN |

apertures" concepts. It may be applied to passive "phased" arrays although the losses for that application may be prohibitive. It can be applied to active "phased" arrays where losses can be made up by amplification on both transmit and receive.

For wide instantaneous bandwidth performance, in the conventional design of the prior art, long-time delay circuits have to be added, either with sub-arrays, or for ultra-widebandwidth, with one circuit per antenna element. This adds greatly to the complexity and cost of the antenna. Compromises are possible where the array is broken into subarrays with phase shifters. This results in fewer switched time-delay circuits but there is a corresponding limitation in bandwidth which is reduced to that of a subarray.

The preferred embodiments described above makes multiple use of switched time-delay circuits and thereby significantly reduce the total complexity of the system now practiced by the art. The teachings of the preferred embodiments make multiple use of switched time-delays and are applicable, preferably, to active arrays, where the losses are compensated by amplification of both transmitter and receiver signals, however, as stated above, such amplification may be added to other types of systems to make utilization of the preferred embodiments feasible.

The ultra-wideband architectures for switchable time-delay beamsteering of an antenna array are akin to the use of tapped delay lines as described in *Radar Handbook* 11-1 through 11-71 and 13-10, (Skolnick ed. 1970), which is hereby incorporated by reference. The same switched time-delay circuits are used for a multiplicity of antenna elements, and thereby greatly simplify wideband array scanning in comparison to conventional methods where switchable long time-delay circuits are used at each radiating element. Series feed networks are the simplest, but with large arrays high insertion losses have been shown. The effect of this loss is reduced by adding amplification. Series feeds with subarrays and corporate feed systems, by comparison, have shown a much smaller insertion loss. However, their total switchable time-delays are greater than with the series configuration, but still much smaller than with the conventional system now utilized in the art.

Although the invention has been described in relation to exemplary embodiments thereof, it will be understood by those skilled in the art that still other variations and modifications can be affected in these preferred embodiments without detracting from the scope and spirit of the invention.

What is claimed is:

1. An apparatus for beamforming in a broadband antenna array having a plurality of antenna elements comprised of:

a plurality of electromagnetic transmission lines forming a at least two branches;

means for splitting a broadband electromagnetic signal, in a transmit mode, into a plurality of electromagnetic signals applied, respectively, to each branch of the plurality of branches, or, in a receive mode, combining a plurality of electromagnetic signals from each branch into a composite electromagnetic signal;

a plurality of antenna feed lines coupled to each branch and an associated antenna element; and means for selectively inserting a finite amount of line-delay in at least two of the branch lines prior to each antenna feed line for varying the amount of time-delay in each antenna feed line to selectively delay the electromagnetic signal to the associated antenna element, thereby directing the beam of the array in a predetermined direction by selectively adjusting the time-delay to each antenna.

2. An apparatus, as in claim 1, wherein one or more antenna feed lines are further comprised of one or more lengths of electronic transmission feed line forming a fixed bias delay.

3. An apparatus, as in claim 1, further comprising:

means for amplifying the delayed electromagnetic signal in each antenna feed line prior to the electromagnetic signal being applied to the associated antenna element;

means for amplifying an electromagnetic signal received by the antenna element and applying the amplified electromagnetic signal to an associated antenna feed line; and means for switching each antenna element from a receive to a transmit, or vice versa, mode of operation.

4. An apparatus, as in claim 1, further comprised of a means for amplifying and switching the electromagnetic signal in at least two branches of the plurality of branches to compensate for an insertion loss of electromagnetic signal introduced into the branch by the line delay.

5. An apparatus, as in claim 1, wherein the means for selectively inserting a finite time-delay is further comprised of a plurality of feed line segments of varying length, selectively switchable, coupled together in sequence.

6. An apparatus for beamforming a broadband antenna array having a plurality of antenna elements comprised of:

an electromagnetic signal transmitter and receiver for selectively generating and receiving a broadband electromagnetic signal;

a plurality of electromagnetic transmission lines forming a at least three branches;

means for splitting the electromagnetic signal, in a transmit mode, into a plurality of electromagnetic signals applied, respectively, to each branch of the plurality of branches, or, in a receive mode, combining a plurality of electromagnetic signals from each branch into a composite electromagnetic signal;

a plurality of antenna feed lines coupled to each branch and an associated antenna element;

means for selectively inserting a finite amount of line-delay in at least two of the branch lines prior to each antenna feed line for varying the amount of delay in each antenna feed line to selectively delay the electromagnetic signal to the associated antenna element, comprised of a plurality of feed line segments of varying length selectively switchable, coupled together in sequence, thereby directing the beam of the array in a predetermined direction by selectively adjusting the time-delay to each antenna;

at least one amplifier, configurable to the same mode of operation as the electromagnetic signal transmitter and receiver, located in at least two branches of the plurality of branches to compensate for a loss of electromagnetic signal caused by the insertion of the line delay;

an amplifier located in each antenna feed line prior to the antenna element, in the transmit mode, to amplify the delayed electromagnetic signal prior to the electromagnetic signal being applied to the associated antenna element and, in the receive mode, for amplifying an electromagnetic signal received by an associated antenna element; and a switch in each antenna feed line to select the same mode of operation for the amplifier as the electronic signal transmitter and receiver.

7. An apparatus for beamforming a broadband antenna array having a plurality of antenna elements comprised of:

an electromagnetic signal transmitter and receiver for selectively generating and receiving a broadband electromagnetic signal;

a plurality of electromagnetic transmission lines forming a plurality of branches comprised of at least a right branch and a left branch;

a plurality of antenna feed lines coupled to each branch and an associated antenna element of the array;

one or more antenna feed lines are which further comprised of one or more lengths of electronic transmission feed line forming a fixed bias delay;

an electronic signal splitter which, in the transmit mode, selectively splits the generated electromagnetic signal into a plurality of electromagnetic signals applied, respectively, to each branch of the plurality of branches and which, in the receive mode, the electronic signal splitter combines a plurality of electromagnetic signals received by the elements of the antenna array into a single electromagnetic signal;

the electronic signal splitter being further comprised of a switch to selectively configure the electronic signal splitter to the same mode of operation as the electromagnetic signal transmitter and receiver;

a plurality of line-delay modules located in the branch lines at least one of which is prior to each antenna feed line comprised of a plurality of feed line segments of varying length, selectively switchable, coupled together, in sequence, to selectively delay the electromagnetic signal in the antenna feed line of the associated antenna element so as to orient the transmitted or received electromagnetic beam in a predetermined direction by selectively adjusting the time-delay to each antenna;

at least one amplifier, configurable to the same mode of operation as the electromagnetic signal transmitter and receiver, located in at least two branches of the plurality of branches to compensate for a loss of electromagnetic signal caused by the insertion of the line delay;

an amplifier located in each antenna feed line prior to the antenna element, in the transmit mode, to amplify the delayed electromagnetic signal prior to the electromagnetic signal being applied to the associated antenna element and, in the receive mode, for amplifying an electromagnetic signal received by an associated antenna element; and a switch in each antenna feed line to select the same mode of operation for the amplifier as the electronic signal transmitter and receiver.

8. A method for beamforming in an antenna array having a plurality of antenna elements comprising the steps of:

selecting a predetermined time-delay for an electromagnetic signal applied to each antenna element of antenna elements; and adjusting the line-delay to each antenna feed line so as to cause a composite electromagnetic signal emitted from the plurality of antenna elements to be directed in a predetermined direction.

* * * * *